Patented Mar. 10, 1931

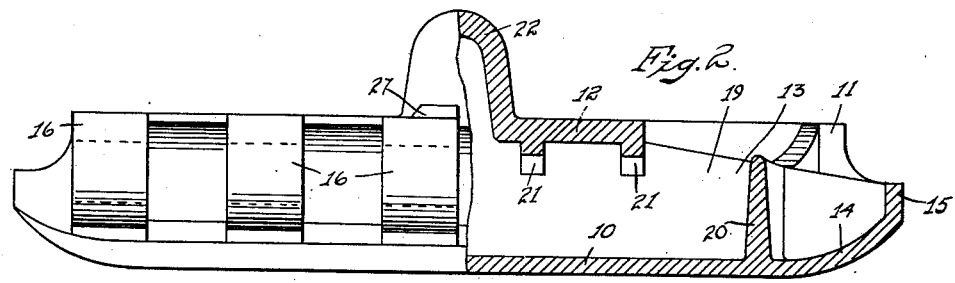

1,795,618

UNITED STATES PATENT OFFICE

GEORGE T. RONK, OF CEDAR RAPIDS, IOWA

SHOE FOR TRACTOR TREADS

Application filed July 10, 1928. Serial No. 291,671.

This invention relates to improvements in shoes designed to be used in connection with the linked type of tractor treads, and particularly designed to be used in connection with that type of tractor treads illustrated and described in my co-pending application for United States Letters Patent on tractor tread, filed February 28, 1928, Serial Number 257,774, in which is employed a special sprocket for driving the tread, the tread and the sprocket being designed and shaped so that when coacting with each other, small stones and rocks will be pinched or thrown out of position with the contact members between the sprockets and the tread to prevent crushing of the stones or rocks, and to relieve the tread of undue strains.

It is therefore the object of my invention to provide a tread having means adapted to co-operate with the above mentioned sprocket, and which may be formed of a single casting, and when cast is complete in itself without the necessity of adding other members to the tread such as cover plates.

A further object is to provide a tread member having an improved lug for making contact with the sprocket and providing means whereby motion will be imparted to the tread from said sprocket, so that the sprocket and lug will not be separated by lateral strains such as caused by turning the tread members around corners.

A further object is to provide in a tread, of that type formed of a single casting, improved means for reinforcing and strengthening the casting, the tread being so shaped and formed that it may be easily cast.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of a pair of my improved treads pivotally connected together, a larger part of one of the tread members being broken away.

Figure 2 is a front elevation of one of the tread members, one end of the front side being broken away.

Figure 3 is a side elevation of several of the tread members pivotally connected together, showing the manner in which the sprocket co-operates therewith, one of said tread members being in section.

Figure 4 is a detail sectional view taken on the line 4—4 of Figure 3.

My improved tread comprises a bottom member 10 having front and back members 11 and a top plate 12, the top plate being located midway between the ends of the side members and considerably shorter than the side members, as clearly illustrated in Figures 1 and 2, so that an opening or space 13 is provided between the ends of the bottom 10 and the ends of the member 12. Each end of the member 10 is provided with an upwardly curved portion 14, which terminates in an upwardly extending portion 15.

Each of the side members 11 has its outer surface provided with laterally projecting hinge members 16 spaced apart. The members 16 of one side member 11 are arranged in staggered relation with those of the other side member, so that two adjacent shoes may be pivotally connected together by means of a suitable pin 17. The lugs of one of the side members interlock those of an adjacent side member in the manner clearly illustrated in Figure 1. All of the hinge members 16 have openings 18 for receiving the pin 17.

A rib 19 is extended longitudinally through the center of the body portion and designed to support the central portion of the plate 12. The top edge of the rib 19 tapers to the upper edge of the member 15. This rib 19 provides a rigid support for the plate 12, which is designed to carry tread rollers for supporting the weight of the tractor. The rib 19 provides means for supporting the ends of the bottom member 10 against upward movement as weight is applied to the plate 12.

In this connection it should be borne in mind that any one of the shoes of the tread member may be made to carry a large per cent of the load or weight, in case said tread member should run over an upwardly projecting obstacle such as a rock, in which case the strain may be focused at any point of the tread 10 between its ends. It will therefore be seen that the rib 19 greatly strengthens the shoe.

It will further be seen that on account of the lateral strains applied to the tread members, due to the turning or twisting action of the tread as it turns corners, a greater amount of strain is applied to the end hinge member 16 than is applied to the central hinge member.

To strengthen the end member 16 I have provided the transverse ribs 20, said ribs extending through the central portion of the openings 13 so that the cores for forming the cavities of the body may be easily and rigidly supported at the time the casting is being made, and it may be easily and quickly removed after cast.

The plate 12 is further supported by means of transversely arranged ribs 21. The plate 12 is provided with an upwardly projecting lug 22 which coacts with the sprocket 23 for transmitting power from the sprocket to the tread member. The lug 22 is preferably made hollow. The lower end of the cavity communicates with the main cavity of the body portion. The front and back edges of the lug 22 is curved to fit in suitable sockets 24 in the sprocket 23 to prevent lateral movement between the sprocket and said lug after the lug has entered the socket 24. The ends of the teeth 25 of the sprocket 23 are provided with beveled portions 26 designed to make contact with ribs 27 supported on the plate 12 when the shoes are traveling around the sprocket.

It will be seen by referring to Figure 1 that one of the ribs 27 is supported on one side of the transverse center line extending through the lug 22, and the other rib on the opposite side of said center line, so that when two shoes are pivoted together, the outer ends of the adjoining ribs 27 slightly overlap. The width of the beveled face of the sprocket is substantially equal to twice the width of the ribs 27, and so arranged that as the sprocket tooth makes engagement with the lug 22, one of the beveled faces 26 will engage one of the ribs 27, while the other beveled face engages the adjacent rib 27.

By this arrangement it will be seen that one of the ribs 27 will make contact with half of the face of one of the beveled portions 26, so that stones or the like that might rest on the ribs 27 will be crowded over the ends of said ribs or tilted sideways.

On account of the ribs being comparatively narrow, ordinary stones and the like will roll to one side to such an extent that if the stones should be gripped between the ends of the sprocket 23 and one of the lugs 27 at the time the sprocket enters the space between two adjacent lugs, said stones will be forced laterally, and thereby provide means whereby stones and other obstructions will be automatically crowded out of the space between two adjacent lugs, and prevents the stones from wedging between the ends of the sprocket teeth and the shoes, or between the active face of the sprocket teeth and the adjacent end of the lug.

Thus it will be seen that I have provided a shoe especially designed to be used in a tractor tread of the linked type, which may be constructed of a single casting, which is formed hollow and of comparatively light weight, and at the same time properly reinforced, and which is also so constructed that the cores may be easily and rigidly supported while the casting is being formed, and which may be easily removed after cast.

Further I have provided a shoe having improved means for operating in connection with the sprocket, whereby stones and the like will be automatically discharged from engagement with the contacting portions of the sprocket and shoe.

I claim as my invention:

1. An article of manufacture, a traction shoe, each of its side edges being provided with a series of spaced hinge members and its top portion provided with an upwardly projecting substantially rectangular lug, and forwardly and rearwardly extending ribs on said top, said ribs being adjacent to diagonal corners of said lugs and are adapted to engage the teeth of a tractor sprocket wheel.

2. In a series of linked tractor shoes pivotally connected, each shoe being provided with an upwardly projecting lug, forwardly and rearwardly extending ribs intersecting the forward and rearward edges of the lug, said ribs being on opposite sides of a vertical plane extending through the center of the lug transversely of the shoe, the ribs on adjacent shoes overlapping at a point intermediate of said adjacent shoes and adapted to engage the teeth of a tractor sprocket wheel.

GEORGE T. RONK.